Figure 1:
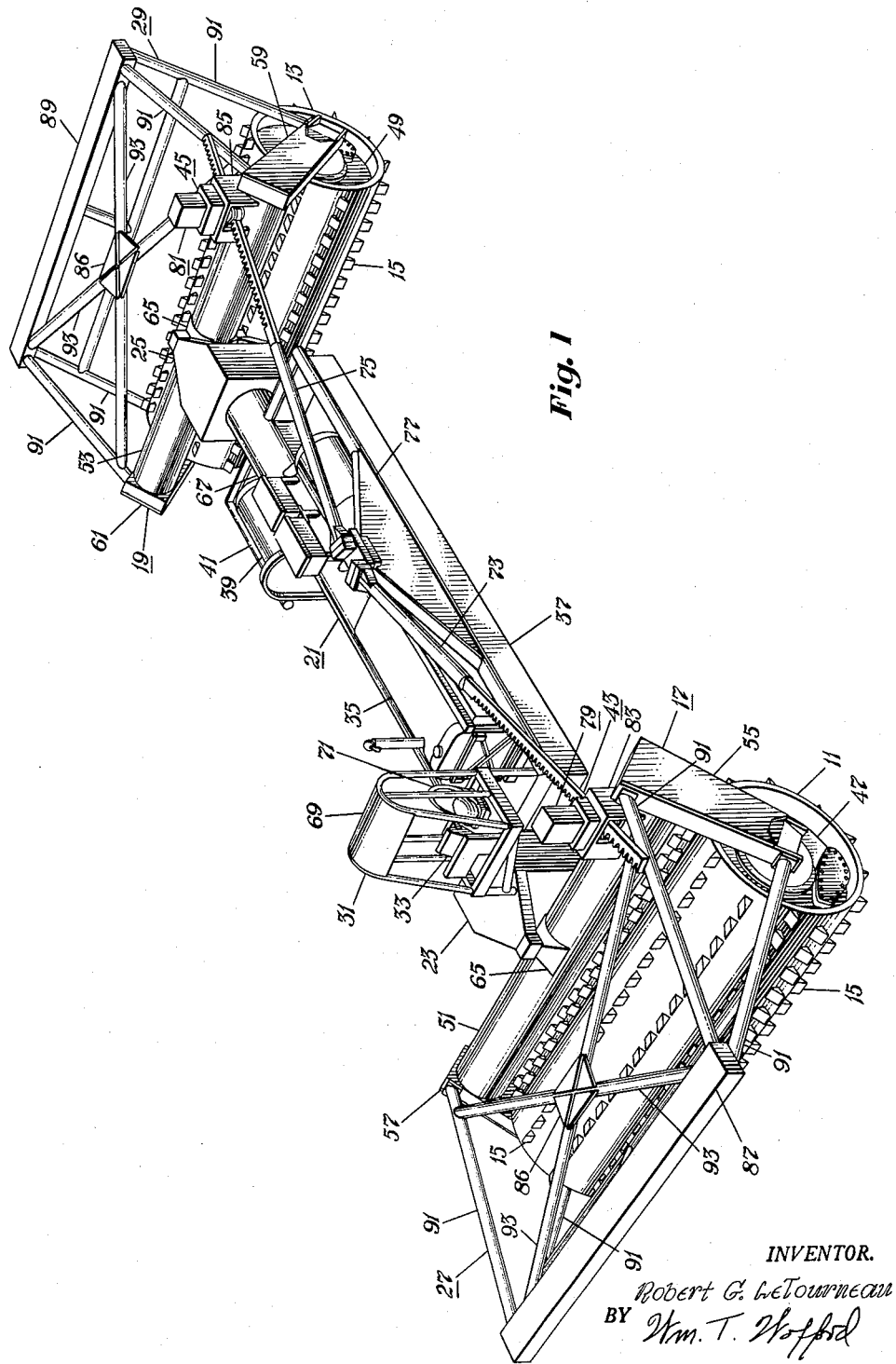

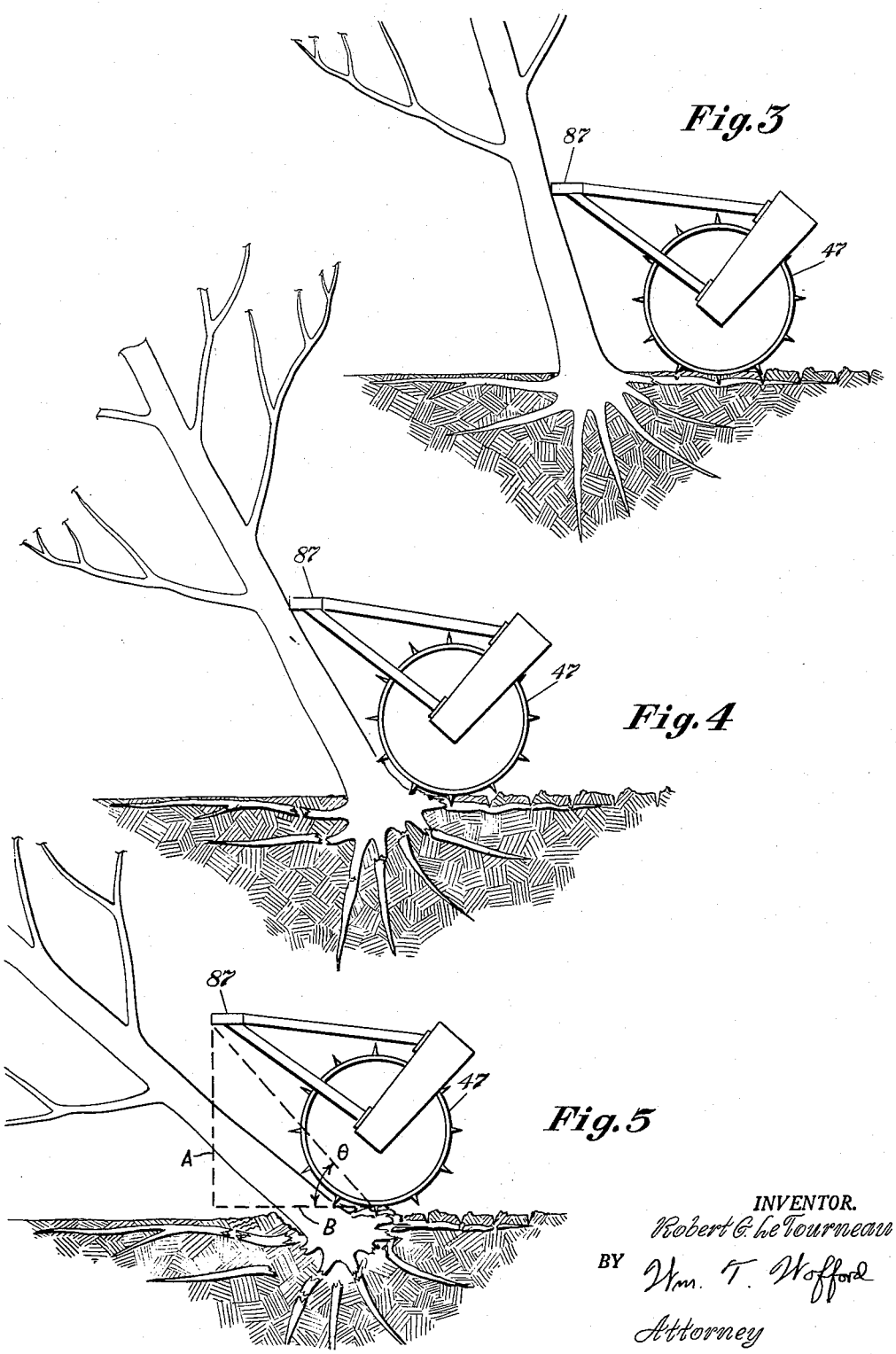

Nov. 8, 1960    R. G. LE TOURNEAU    2,959,201
LAND CLEARING MACHINE
Filed Aug. 25, 1958    4 Sheets-Sheet 4

INVENTOR.
Robert G. LeTourneau
BY Wm. T. Wofford
Attorney

United States Patent Office 2,959,201
Patented Nov. 8, 1960

2,959,201

LAND CLEARING MACHINE

Robert G. LeTourneau, P.O. Box 2307, Longview, Tex.

Filed Aug. 25, 1958, Ser. No. 758,646

4 Claims. (Cl. 144—34)

My invention relates to land clearing machines, and more particularly to a novel self-propelled machine utilizing ground engaging rollers with cutter blades arrayed thereon. This application is a continuation-in-part of my co-pending application Serial No. 493,975, filed March 14, 1955, and now abandoned.

Land clearing employing conventional machines and methods is expensive, and in many cases, prohibitively so. Sawing requires individual attention to each larger tree, leaving smaller trees and bushes to other means. Dozing is very tedious, and cannot effectively cope with larger trees. Tractors pulling ball and chain loops do not clear clean, and are not effective for bushes and small vegetation. Some types of machines uproot the trees, leaving undesirable large root-dirt masses above ground and accompanying cavities in the ground. Usually, when a tree is uprooted, the roots on the back and lower side of the tree remain sufficiently intact to keep the tree or a portion of it alive for some time, thus prolonging the decay period. Such root masses and cavities pose difficult problems in later phases of the land clearing operations, especially in the case of the larger trees. Further, none of the above-mentioned machines or methods contribute significantly to enhancement of decay or facilitating disposition of the severed or fallen vegetation.

It is accordingly an object of my invention to provide a novel and more effective land clearing machine.

It is another object of my invention to provide a land clearing machine which is effective for clearing all sizes of vegetation, both large and small.

Another object of my invention is to provide a novel land clearing machine which does not require the giving of individual attention to larger trees.

Another object of my invention is to provide a novel land clearing machine which will clear land at a faster rate than conventional machines and methods.

Another object of my invention is to provide a novel land clearing machine which will enhance decay and facilitate disposition of severed and fallen vegetation.

It is another object of my invention to provide a novel land clearing machine which will fell, break up, and partially masticate all vegetation in its path.

Another object of my invention is to provide a novel land clearing machine which will uproot trees without leaving large root-dirt masses above ground with accompanying ground cavities.

Another object of my invention is to provide a land clearing machine incorporating novel structural arrangements.

Another object of my invention is to provide a land clearing machine which shall have novel propulsion and steering arrangements.

Figure 2:
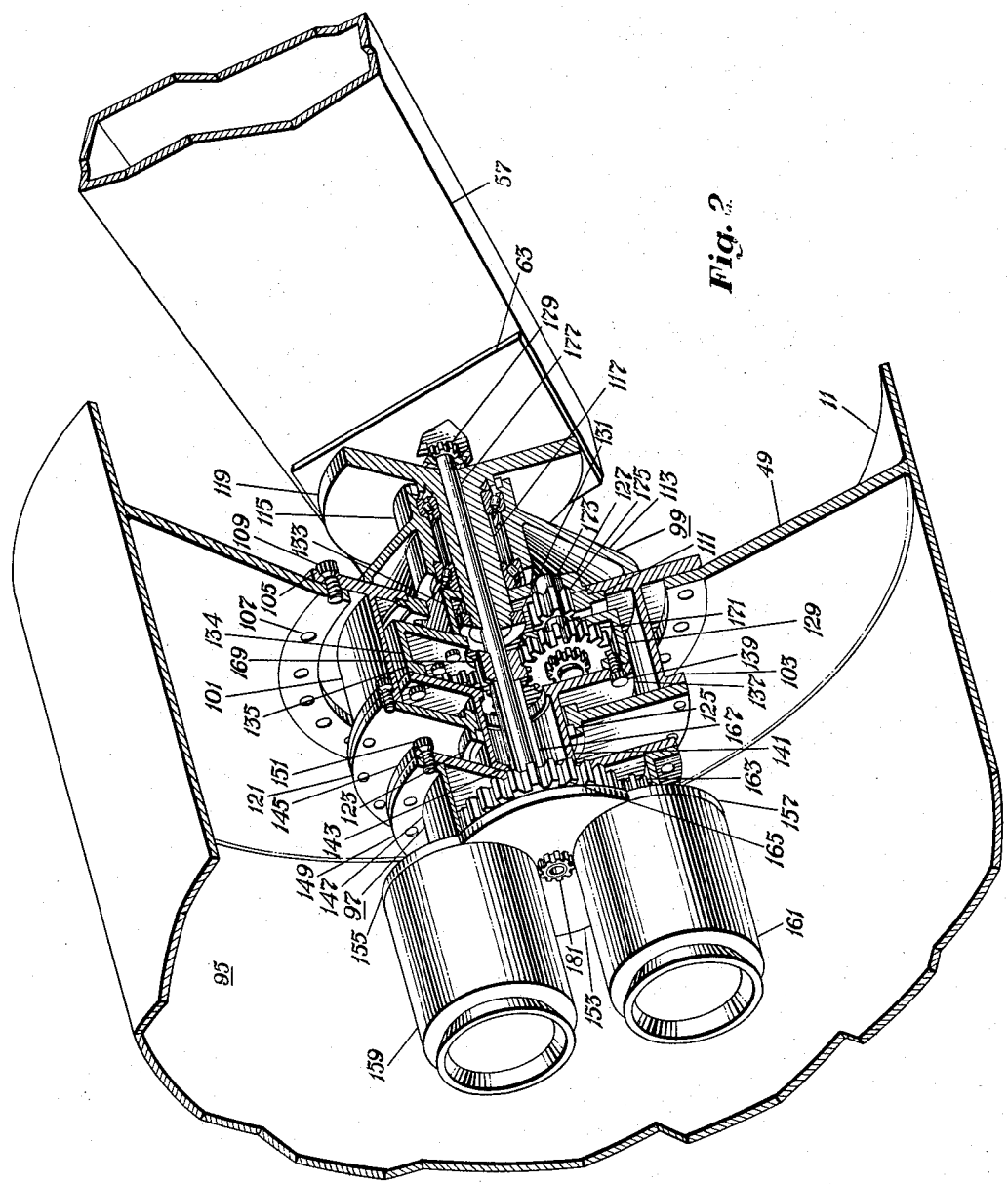

Additional objects and advantages of my invention will be apparent from the following description taken together with the accompanying drawings in which:

Fig. 1 is a schematic perspective view showing a preferred embodiment of my invention, and Fig. 2 is a schematic perspective view with portions cut away, showing parts of a propulsion arrangement in accordance with my invention.

Figures 3, 4, 5, 6, 7, and 8 are schematic views showing the progressive action of the machine of my invention as it operates on a typical tree.

Referring now to Fig. 1, it will be seen that the land clearing machine there shown generally comprises front and rear ground engaging rollers, 11, 13 having cutter blades 15 arrayed on their surfaces, front and rear fork assemblies 17, 19 journalled to the respective rollers, an elongated main frame 21 having fork pivot yokes 23, 25 fixed at its ends and pivoting to the respective fork assemblies, front and rear pusher beam structures, 27, 29, operators cab 31 and control panel 33, engine generator set 35 and crib 37, fuel tank 39 and crib 41, and front and rear steering assemblies 43, 45. The roller propulsion, which is shown by Fig. 2 will be hereinafter described.

The rollers 11, 13 are fabricated from heavy steel sheets rolled to cylindrical shape and having their end edges welded together. Roller end webs 47, 49 and center webs (not shown) in the form of heavy steel rings are welded to the inner periphery of the cyinders to lend rigidity, and in the case of the end webs, to support the fork and roller drive assemblies. The cutter blades 15 take the form of heavy sharp steel wedges welded at their bases to the roller outer surface. The cutter blades are arranged in spaced transverse rows around the circumference of the rollers. Alternate rows are staggered with respect to adjacent rows. The fork assemblies 17, 19, each comprise a heavy tubular cross member 51, 53 welded to the upper portions of the inner faces of box-like fork side members 55, 57, 59, 61. The side members are fabricated by welding heavy sheet metal members to form a long relatively flat box-like structure which is esesntially a re-inforced box beam having slightly tapering width and being open at the smaller end, which is the end journalled to the roller. The inner face of the smaller end of the side member has a rectangular reinforcing pad 63 welded thereto (see Fig. 2.) Aligned bolt holes (not shown) are arranged in equally spaced circular patern on the reinforcing pad and side member. Matching threaded bolt holes in a drive assembly-to-fork bolt ring enable bolting of the fork side member to the roller drive assembly. The outer face of the smaller end of the fork side member is partially cut away to provide access to the bolts.

Ball carrying pedestals 65 spaced 180 degrees apart are welded to the fork assembly cross members 51, 53 at their longitudinal centers. The main frame comprises a long tubular member 67 made of heavy sheet steel. Welded to each end of the main frame longitudinal member is a fork pivot yoke 23, 25. The yokes are fabricated by welding pieces of heavy steel sheet material to form a box-like structure including upper and lower yoke arms which carry opposed inwardly facing ball sockets at their end portions. These sockets receive the balls of the fork structures. The yoke mounting balls are arranged on the fork cross-members in such manner that the fork assemblies are tilted inwardly. This reduces the height of the machine and enhances the mechanical characteristics of the structure.

An engine-generator crib 37 in the shape of an open-top box having a side, bottom and end members, is fixed by welding to one side of the main frame longitudinal member. An engine-generator set 35 is mounted in the crib. The engine generator set supplies power to the propulsion and steering mechanisms to be hereinafter described. The operator's cab 31 is mounted on stilts forward of and above the engine-generator set, providing excellent visibility for the operator, both as to the vegetation being cleared, and as to the machine itself. The cab is provided with a canopy 69 supported by a frame which may be covered with heavy mesh to afford the operator adequate protection against tree limbs, falling debris, etc. The operator's control panel 33 is mounted at the front of the cab so that it can be conveniently and comfortably reached from the operator's seat 71. The fuel tank crib 41 is a welded open-top box structure fixed to the side of the main frame longitudinal member 67 opposite the engine-generator crib 37. The fuel tank 39 is mounted in its crib 41.

Both front and rear rollers 11, 13 are independently steerable by means of long steering arms 73, 75 pivoted at one end to the main frame associated structure and carrying a rack at the other end driven by an electric motor and gear box fixed to the fork structure. Each steering arm has a tubular portion mounting a ball socket at one end and a rack at the other end. A pair of longitudinally spaced upstanding socket balls are fixed to a pedestal which is in turn fixed to a triangular shaped upward extension 77 of the engine-generator crib side member at the central portion thereof. The extension is suitably braced against movement in a transverse direction by members not shown. The sockets at the ends of the steering arms engage the upstanding balls on the pedestal for pivoting action. An electric motor driven gear box assembly 79, 81 is mounted in an upright position on a mounting bracket 83, 85 adjacent the left end portion of the fork cross member 51, 53 of each of the front and rear fork assemblies. The rack portion of each steering arm passes through an opening in the respective mounting bracket and engages the output pinion (not shown) of the gear box assembly. The steering motors are reversible and drive the output pinions in the desired directions along the racks to swing the respective roller in a horizontal plane about the fork pivots to accomplish steering.

The front and rear pusher assemblies 27, 29 each comprise a transversely extending horizontal box beam 87, 89 rigidly secured to and supported by a truss work of tubular members in a position outwardly of and above the respective roller. The truss work comprises a pair of tubular members 91 at each end of the box beam, or pusher beam, each pair diverging from the beam and fixed, one to each end of the front face of the fork side beam. An X-shaped assembly of tubular members 93 has one set of adjacent ends fixed to the pusher beam end portions and the opposite set of adjacent ends fixed to upper truss work side members at their end portions adjacent the fork side members. The center portion of the X-shaped assembly is additionally strengthened by heavy triangular steel plates 86 welded to the apices. Further details of the pusher assemblies will be discussed hereinafter in connection with the explanation of operation of the machine.

Fig. 2 shows a typical roller drive assembly 95. Each drive assembly is completely self-contained and is very readily installed in or removed from the machine as a unit. The drive assembly bolts to the roller and to a fork side member in a simple and effective manner to be hereinafter more fully described. The gearing portion of the drive assembly is associated with a pair of housing units 97, 99, one of which is fixed to the fork side member and does not rotate with the roller and is hereinafter called the fixed housing unit 97. The other housing unit is fixed to the roller, and rotates with the roller, and is hereinafter called the rotatable housing unit 99. The rotatable housing unit comprises a cylindrical portion 101 with an outwardly extending bolt flange 103 at the left end, and a both outwardly and inwardly extending flange 105 at the right end. The outwardly extending flange last mentioned is provided with axially extending equally spaced bolt holes adjacent its outer edges. These bolt holes are matched to bolt holes 107 provided adjacent the inner edges of the roller end web 47, 49. It is by means of bolts 109 in these holes that the drive assembly 95 is mounted to the roller 11, 13. The inwardly extending flange carries the roller ring gear 111, which is fixed to the flange by suitable means. A frusto-conical shaped portion 113 extends to the right of the both outwardly and inwardly extending flanges of the rotatable housing, and provides support for an axially extending hub 115 which is fixed to its small end. A hollow stub axle is journalled in the hub by means of spaced roller bearings. The stub axle 117 carries an integral disc-shaped drive assembly-to-fork bolt ring 119 at its outer end. It is by means of this bolt ring that the drive assembly is mounted to the fork assembly. The stub axle serves to support the fork assembly on the roller, and also serves as a bearing surface for a portion of the aforementioned fixed housing. The outwardly extending flange 103 on the left end of the rotatable housing is provided with equally spaced axially extending bolt holes which match with bolt holes on a disc-shaped end closure member 121. The central portion of the closure member 121 has the shape of an annular flange 123. The closure member has a large bore, so that the inner surface of the last mentioned flange forms a bearing surface which bears on a portion of the fixed housing. The inner left side of this flange 123 is notched to receive an oil seal ring 125.

The fixed housing includes a first section which comprises inner and outer gear carrying spiders 127, 129, respectively. The inner spider comprises a thick plate portion having the general shape of an equilateral triangle, with three bearing mount holes 120° apart and located just inward of the apices of the triangle. The center of the plate has an opening therein which carries a splined hub fixed to the plate. The splined hub mounts on the left end portion of the stub axle which is correspondingly splined, and is locked thereon by a lock nut 131. The left face of the plate carries three fixed spacer blocks 133 located along the sides of the plate between the bearing mount holes, and extending axially from the left side of the plate. The outer spider 129 is fixed to the spacer blocks by means of bolts. The outer spider comprises a disc-shaped heavy plate portion which has three bearing mount holes spaced 120° apart and matching the bearing mount holes of the inner spider. The plate portion also has a central opening. The outer spider has a cylindrical housing portion 134 extending axially to the left of the disc and fixed to the outer periphery thereof. The cylindrical housing portion 133 has an inwardly extending flange 135 at its left end, which flange is provided with equally spaced axially extending bolt holes. The second section of the fixed housing comprises a disc shaped portion 137 having a central opening and having equally spaced axially extending bolt holes adjacent its outer peripheral portion, which holes match with the bolt holes of the inwardly extending flange 135 last mentioned. The second section of the fixed housing is secured to the first section by means of bolts 139. The second section of the fixed housing has a cylindrical portion 141 which extends axially to the left of the disc portion 137 and has an inwardly extending flange 143 at its left end. The right end of this cylindrical portion 141 is integral with the disc portion 137. The outer periphery of this cylindrical position acts as a bearing support for the left end of the rotatable housing. The inwardly extending flange 143 last mentioned is provided with equally spaced axially extending bolt holes. The third section of the fixed housing comprises a disc shaped piece 145 having a central opening and provided with equally spaced axially extending bolt holes adjacent its outer and inner peripheral portions. The inner bolt holes match with those of the inwardly extending flange 143 last mentioned. The second and third sections of the fixed housing are secured to each other by means of bolts. The fourth section of the fixed housing comprises a cylindrical portion 147 having an outwardly extending flange 149 at its right end, which flange has equally spaced bolt holes matching those on the outer peripheral portion of the third section above-mentioned. The third and fourth sections of the fixed housing are secured together by means of bolts 151. The left end of the cylindrical portion 147 last mentioned, is integral with an end plate 153. The end plate comprises a circular central portion having central opening, and two outwardly extending portions 155, 157 on opposite sides of the central portion. The outer peripheries of the extension portions conform to circular arcs having radii approximately one half that of the central portion, and having centers approximately on the circumference of the central circular portion. The extension portions have central openings to receive bearings.

A pair of electric drive motors 159, 161 are mounted on the end plate, with their output shafts riding on bearings which are carried by the central openings of the extension portions above-mentioned. The motor output pinions 163 mesh with a drive gear 165 on its opposite sides. The drive gear is fixed to a hollow drive shaft 167 which is supported adjacent its left end by a bearing carried by the central opening of the third fixed housing section aforementioned. The right end of the hollow drive shaft is floating, and carries a drive pinion 169 which meshes with three countershaft gears 171 spaced 120° apart on the pinion outer periphery. The countershafts 173 are mounted in bearings carried by the bearing mount holes of the inner and outer spiders 127, 129 of the fixed housing first section. A countershaft pinion 175 is mounted on each of the three countershafts between the inner and outer spider. The countershaft pinions 175 mesh with the roller ring gear 111 carried by the rotatable housing. A hollow tube 177 passes through the center opening in the stub axle and the drive shaft and is fixed by locknuts 179, 181 to the stub axle 117 at the right end and to the end plate 153 at the left end, providing a passage for electric power cable (not shown) which are brought down through the fork side member, and through the hollow tube, to the drive motors.

It is apparent that with the tree roller structure shown and described, it is possible to feed electric power via cables to the points of application, with the cables essentially fully enclosed and protected by the machine. The machine structure is simple and rugged, with no fragile parts exposed. The roller drive means are fully enclosed, the drive assemblies being located entirely within the rollers. These considerations are very important, it being remembered that the conditions of operation will involve all manner of falling, flying, and moving debris which would inevitably damage any exposed fragile parts and tend to clog any exposed moving parts. Since all moving parts are electrically driven, power can be simply and conveniently supplied to the points of application, and the entire machine can be easily controlled by means of finger-tip actuated toggles located on the operator's control panel. The toggles actuate contactors which in turn control the power circuits. The machine has proven extremely effective in actual operation for clearing land under various vegetation and terrain conditions. Smaller vegetation is completely leveled, crushed, and broken up by the rollers and cutter blades. The machine is symmetrical at front and rear, so that it can operate effectively in either direction.

Figure 6:
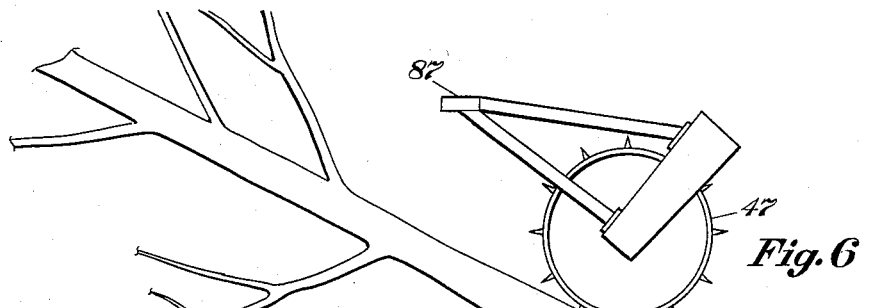
Figure 7:
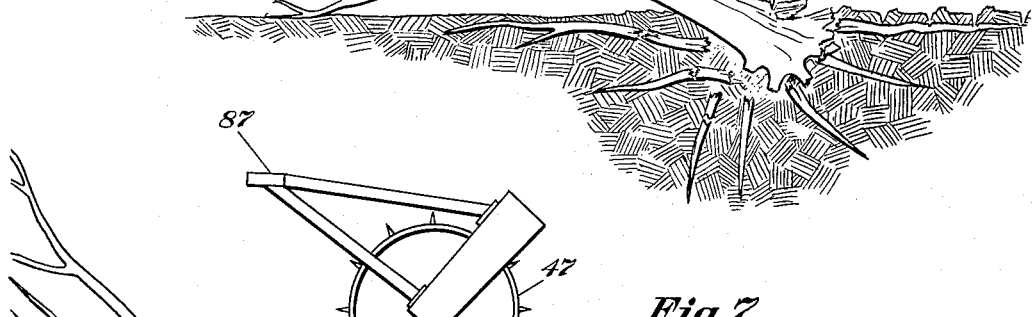
Figure 8:

Figures 3 through 8 of the drawings illustrate the action of the machine of my invention in successive stages of operation in the felling of a typical tree. These drawings are not theoretical, but are based upon actual experience with the machine. Only one roller and the pusher structure of the machine are shown in Figures 3 through 8, since such showing is deemed sufficient for the illustrative purpose at hand. In Figure 3, the push beam has contacted the tree trunk, and has pushed it over to some extent, but the machine front roller has not yet contacted the tree. It should be noted that the roots on the machine side of the tree are broken before the front roller contacts the tree. The action in this phase of the operation is that the front roller is bearing on the root system with sufficient weight to hold the root system and surrounding earth in place while the push beam pushes the tree trunk over sufficiently to break the roots on the machine side of the tree. In Figure 4, the roller has just made contact with the tree trunk, and the tree is about to go over. The action in this phase of the operation is that the tree has been pushed over sufficiently, with the machine front roller holding the earth and root system in place as it progresses toward the trunk, that roots on the back side of the tree are broken by a combination tensioning and bending action. Also, impact of the roller when it hits the tree base enhances the root breaking action. In Figure 5, the tree has fallen over to such extent that the push beam is no longer in contact with the tree, and the roller is on the trunk base, thus causing further displacement of the trunk base with respect to the root system. In Figure 6, the roller has begun to advance on the tree trunk, forcing the upper part of the trunk to the ground, breaking the branches on the underside of the tree, mutilating the trunk base, and further displacing the trunk base with respect to the root system. In Figure 7, the tree trunk is essentially flat on the ground, with the trunk base partially out of the ground and completely severed from the root system, and with the roller cutter blades proceeding with mutilation of the trunk. In Figure 6, the machine rear roller is shown advancing on the tree trunk, causing further mutilation of same. It should be noted that the trunk base has been completely severed from the root system, and there is no root-dirt mass and accompanying cavity, but on the contrary, the earth around the original tree trunk location is relatively undisturbed.

The optimum size, weight, and dimensions for the machine of my invention will vary depending upon the maximum size of the trees to be encountered. For clearing land with trees up to 12 inches in diameter, a machine having the following specifications would be satisfactory: roller diameter—74 inches; roller width—12 feet; distance between rollers, center to center—30 feet; push beam height—7½ feet; push beam distance from roller centerline—8 feet, 3 inches; cutter blade height—5 inches; machine weight—100,000 pounds. For clearing land with trees up to 48 inches diameter, satisfactory machine specification would be: roller diameter—8 feet; roller length—20 feet; distance between rollers, center to center—49 feet; push beam height—13 feet; push beam distance from roller centerline—11 feet, 8 inches; cutter blade height—6 inches; machine weight—300,000 pounds. In order to achieve the type of action illustrated by Figures 3 through 8, it is necessary that the machine have sufficient weight so that the front roller will hold the root system and surrounding earth in place; the push beam should be close enough to the roller to allow the roller to bear on the root system when the push beam contacts the tree trunk, and far enough away from the roller that the roots on the roller side of the tree will be broken before the roller contacts the tree; and the push beam should be high enough to achieve optimum leverage, but not so high as to cause the tree trunk to be broken above the ground. As a general rule, the angle $\theta$ in Fig. 5 between the base and hypotenuse of a right triangle wherein the base B is the shortest distance from the roller center line to a vertical plane which passes through the push beam, and the other leg C is the push beam height, should preferably be in the range of between 35 and 55 degrees. The machine weight should range from the neighborhood of from 30 to 50 tons for handling trees up to 12 inches in diameter to approximately 150 tons for handling trees up to 48 inches in diameter.

While I have shown my invention in only one form, it will be obvious to those skilled in the art that it is not so limited, but is susceptible of various changes and modifications without departing from the spirit thereof.

I claim:
1. A land clearing machine comprising a main frame, front and rear fork assemblies mounted at the ends of said frame for steerable movement in a horizontal plane, front and rear ground engaging rollers carried by said fork assemblies, cutter blades arrayed on the surface of said rollers, a rigid push beam structure mounted to said front fork assembly and extending above and forwardly therefrom, said structure including a push beam disposed parallel to said front roller and co-extensive with the width of said machine, said push beam extending above said front roller at a height and to a distance and said front roller being of a diameter so that the weight of said front roller is placed upon the ground immediately adjacent a tree of at least a 12 inch diameter immediately prior to and as the trunk of said tree is broken from its roots.

2. A land clearing machine comprising a main frame, front and rear fork assemblies mounted at the ends of said frame for steerable movement in a horizontal plane, front and rear ground engaging rollers carried by said fork assemblies, cutter blades arrayed on the surface of said rollers, a rigid push beam structure mounted to said front fork assembly and extending above and forwardly therefrom, said structure including a push beam disposed parallel to said front roller, said push beam extending above said front roller at a height and to a distance and said roller being of a diameter so that the weight of said front roller is placed upon the ground immediately adjacent a tree of at least twelve inch diameter immediately prior to and as the trunk of said tree is broken from its roots by forward motion of said machine against such tree.

3. A land clearing machine comprising a main frame, front and rear fork assemblies mounted at the ends of said frame with at least one said assembly arranged for steerable movement in a horizontal plane, front and rear ground engaging rollers carried by said fork assemblies, cutter blades arrayed on the surface of said rollers, a rigid push beam structure mounted to said front fork assembly and extending above and forwardly therefrom, said structure including a push beam disposed parallel to said front roller, said push beam extending above said front roller at a height and to a distance and said roller being of a diameter so that the weight of said front roller is placed upon the ground immediately adjacent a tree of at least twelve inch diameter immediately prior to and as the trunk of said tree is broken from its roots by forward motion of said machine against such tree.

4. A land clearing machine comprising a main frame, front and rear ground engaging rollers, means supporting said main frame on said rollers with at least one of said rollers being steerable in a horizontal plane, cutter blades arrayed on the surface of said rollers, a rigid push beam structure mounted to the front portion of said machine and extending above and forwardly of said front roller, said structure including a push beam disposed parallel to said front roller, said push beam extending above said front roller at a height and to a distance and said roller being of a diameter so that the weight of said front roller is placed upon the ground immediately adjacent a tree of at least twelve inch diameter immediately prior to and as the trunk of said tree is broken from its roots by forward motion of said machine against such tree.

References Cited in the file of this patent

UNITED STATES PATENTS

| | | |
|---|---|---|
| 1,059,357 | Green | Apr. 22, 1913 |
| 2,173,406 | Wilkinson | Sept. 19, 1939 |
| 2,191,048 | Tims | Feb. 20, 1940 |
| 2,295,458 | Edwards | Sept. 8, 1942 |
| 2,691,927 | Denton | Oct. 19, 1954 |
| 2,722,758 | Loftin et al. | Nov. 8, 1955 |

FOREIGN PATENTS

| | | |
|---|---|---|
| 22,156 | Finland | Dec. 18, 1947 |